(12) United States Patent
Chen et al.

(10) Patent No.: US 8,153,294 B2
(45) Date of Patent: Apr. 10, 2012

(54) MULTIPLE-CELL BATTERY

(75) Inventors: Wei Chen, GuangDong (CN); Kitchu Lam, GuangDong (CN)

(73) Assignee: Dongguan Amperex Technology Limited, Guangdong province (CN)

( * ) Notice: Subject to any disclaimer, the term of this patent is extended or adjusted under 35 U.S.C. 154(b) by 500 days.

(21) Appl. No.: 12/408,364

(22) Filed: Mar. 20, 2009

(65) Prior Publication Data

US 2009/0239138 A1   Sep. 24, 2009

(30) Foreign Application Priority Data

Mar. 21, 2008  (CN) .......................... 2008 2 0092849

(51) Int. Cl.
*H01M 2/26* (2006.01)
*H01M 6/00* (2006.01)
*H01M 6/42* (2006.01)

(52) U.S. Cl. ........ 429/161; 429/149; 429/156; 29/623.1

(58) Field of Classification Search .................. 429/185, 429/129, 149, 178, 120, 97, 161, 160, 156; 29/623.1
See application file for complete search history.

(56) References Cited

U.S. PATENT DOCUMENTS

| 1,437,986 | A | * | 12/1922 | Meyer et al. | .................. 429/178 |
| 3,834,945 | A | * | 9/1974 | Jensen et al. | .................. 429/120 |
| 2008/0063932 | A1 | * | 3/2008 | Ishizu et al. | .................. 429/129 |

FOREIGN PATENT DOCUMENTS

CN   200620001192.9   3/2007

* cited by examiner

*Primary Examiner* — Jonathan Crepeau
*Assistant Examiner* — Kenneth Douyette
(74) *Attorney, Agent, or Firm* — Quinn Law Group, PLLC

(57) ABSTRACT

A multiple-cell battery includes a battery case and a number of cells positioned in the battery case. Each of the cells includes a positive lead and a negative lead. A number of electrically conductive elastic elements are correspondingly seated between every two adjacent positive leads and/or negative leads. The elastic elements each include at least two contacting portions resiliently abutting against the two adjacent positive leads and/or negative leads, so as to connect the cells in series and/or in parallel.

9 Claims, 2 Drawing Sheets

1

MULTIPLE-CELL BATTERY

CROSS-REFERENCE TO RELATED APPLICATIONS

The present invention claims priority to Chinese Patent Application No. CN 200820092849.6 filed Mar. 21, 2008, which is incorporated by reference herein in its entirety.

FIELD OF THE INVENTION

The present invention generally relates to batteries and, more particularly, to a multiple-cell battery having a number of cells connected in series and/or in parallel, so as to provide required voltage and capacity.

BACKGROUND OF THE INVENTION

Lithium-ion batteries, especially multiple-cell lithium-ion batteries, are widely used in various electric vehicles, hybrid engine vehicles and electric bicycles due to high energy density, high specific energy, long cycle life and flexible and lightweight design.

Generally, a conventional multiple-cell lithium-ion battery includes a battery case and a number of cells housed in the battery case. Each of the cells includes a positive electrode having a positive lead and a negative electrode having a negative lead. The positive leads and/or negative leads are connected in series and/or in parallel to meet different requirements of voltage and energy. Typically, the positive leads and/or negative leads of the cells are connected with each other in series and/or in parallel via soldering. However, the soldering procedure is not only difficult to be carried out but can inevitably adversely affect the performance of the cells due to exposure to the high temperature in soldering process.

To overcome the foregoing disadvantage, Chinese Patent Application No. CN 200620001192.9 (which is incorporated by reference in the present patent application in its entirety) provides a new design for connecting the positive and/or negative leads of the cells, in which, the positive and/or negative leads of the cells are securely coupled to an electrically insulating mounting board disposed in the battery case. Series and/or parallel connection is established on the mounting board. Certainly, there is no need to carry out the soldering procedure in accordance with the design of CN 200620001192.9. However, the structure of the multiple-cell battery is considerably complicated and assembly of the cells is difficult to be carried out.

What is needed, therefore, is to provide a new multi-cell battery which can be readily assembled.

SUMMARY OF THE INVENTION

One object of the present invention is to provide a multiple-cell battery, in which connection of the positive and/or negative leads does not need soldering procedure and the assembly of the multiple-cell battery can be easily realized.

According to one embodiment of the present invention, a multiple-cell battery includes a battery case and a number of cells suitably housed in the battery case. Each of the cells includes a positive lead and a negative lead. A number of electrically conductive elastic elements are correspondingly situated between every two adjacent positive leads and/or negative leads. Each elastic element includes two contacting portions resiliently abutting against the two adjacent positive leads and/or negative leads, respectively, so as to connect the cells in series and/or in parallel.

In the multiple-cell battery in accordance with one embodiment of the present invention, the positive leads and/or negative leads of the cells can be connected in series and/or in parallel via the elastic elements correspondingly disposed between the every two adjacent positive leads and/or negative leads. No soldering procedure is needed and, therefore, adverse effect of high temperature to the performance of the cells is prevented. Additionally, the elastic elements can be easily disposed between the cells and, therefore, assembly of the multiple-cell battery can be remarkably simplified.

Specifically, each elastic element includes a planar bottom section, and each positive lead and/or negative lead is correspondingly formed with a stepped surface for supporting the planar bottom section of the elastic element.

Specifically, the elastic element is made from copper alloy.

Specifically, each of the elastic elements forms two curved section extending outwardly and upwardly from two distal ends thereof.

Specifically, the elastic element has an U-shaped cross section.

Specifically, each elastic element defines an opening at upper portion thereof and the opening extends along a length direction of the elastic element.

Specifically, the battery case includes an upper cover. The upper cover defines a number of through holes corresponding to the elastic elements.

In according with another embodiment of the present invention, a method for assembling multi-cell battery including the steps of: providing a battery case; securely positioning a number of cells in the battery case, the cells each including a positive lead and a negative lead; and correspondingly disposing a number of electrically conductive elastic elements between every two adjacent positive leads and/or negative leads. The elastic elements each including at least two contacting portion resiliently abutting against the two adjacent positive leads and/or negative leads, respectively.

Other advantages and novel features will be drawn from the following detailed description of preferred embodiments with the attached drawings, in which:

DETAILED DESCRIPTION OF THE INVENTION

Figure 1:
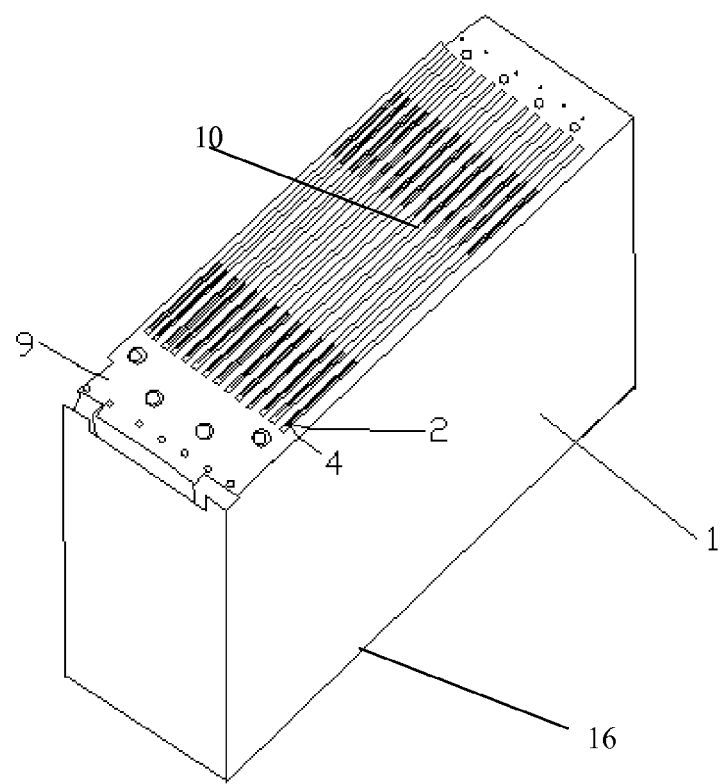
FIG. 1 depicts a perspective view of a multiple-cell battery in accordance with one embodiment of the present invention.
Figure 2:
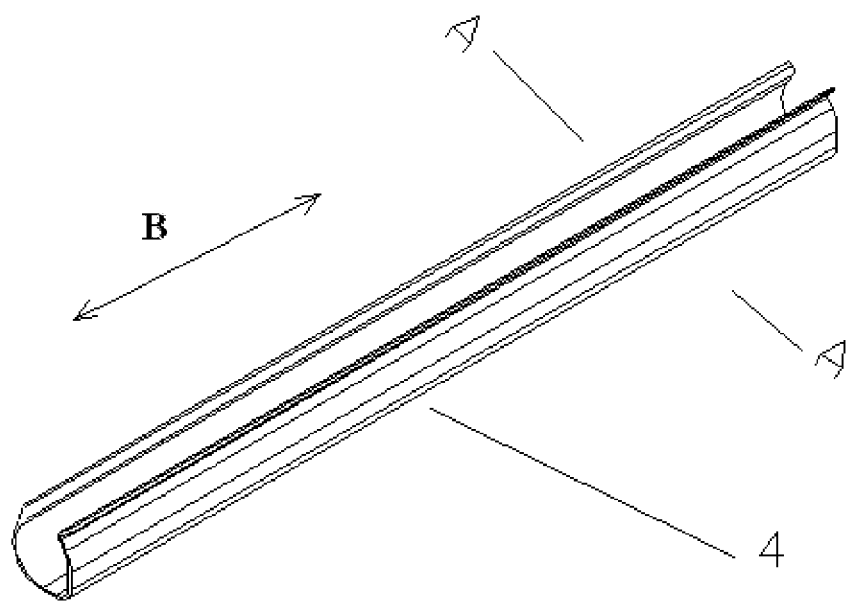
FIG. 2 depicts a perspective view of an electrically conductive elastic element for use in the multiple-cell battery shown in FIG. 1.
Figure 3:
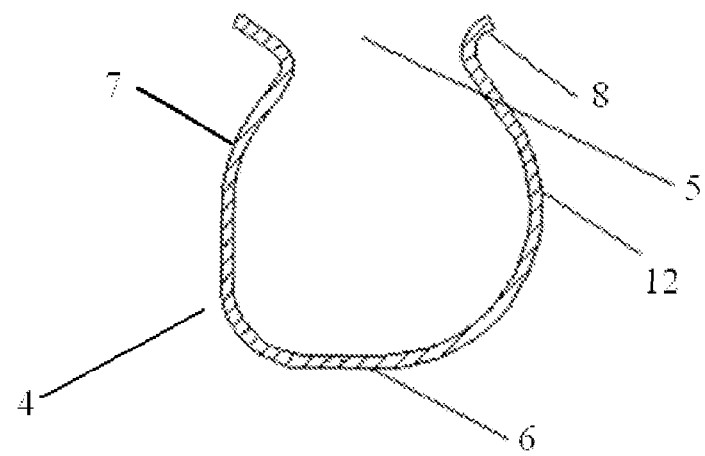
FIG. 3 depicts an exemplary cross-sectional view of the elastic element of FIG. 2 along a line of A-A.
Figure 4:
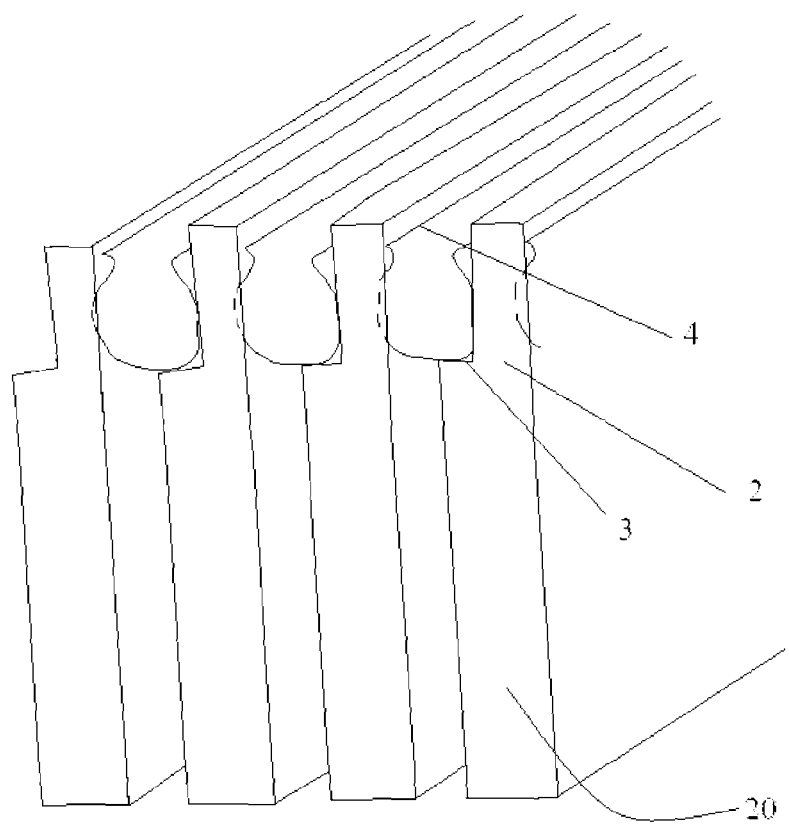
FIG. 4 depicts an exemplary partly assembled view of the multiple-cell battery, showing the elastic elements being positioned between every two adjacent positive leads and/or negative leads.

Referring to FIGS. 1 to 3, a multiple-cell battery according to one embodiment of the present invention includes a battery case 1 and a number of cells 20 suitably seated in the battery case 1. The cells 20 each include a positive lead and/or a negative lead 2. A number of electrically conductive elastic elements 4 are correspondingly seated between every two adjacent positive leads and/or negative leads 2, so as to electrically connect the positive leads and/or negative leads 2 in series and/or in parallel.

Referring particularly to FIGS. 2 and 3, each elastic element 4 is formed with a planar bottom section 6 and two opposite side walls 7 extending upwardly and obliquely from the planar bottom section 6. The planar bottom section 6 can be seated on a stepped surface 3 correspondingly provided on the positive lead and/or negative lead 2. Each of the side walls 7 is formed with a contacting portion 12 protruding outwardly and laterally for resiliently abutting against the sidewalls of the two adjacent positive leads and/or negative leads 2. When properly positioned between two adjacent positive leads and/or negative leads 2, the contacting portions 12 formed on the elastic element 4 resiliently and securely abut against the sidewalls of the positive leads and/or negative leads 2, thereby connecting the cells 20 in series and/or in parallel. In the illustrated embodiment, the elastic element 4 is only formed with two contacting portions 12. However, according to one alternative embodiment of the present invention, the elastic element 4 is formed with more than two contacting portions 12.

The elastic element 4 is provided with an opening 5 opposite to the planar bottom section 6 at an upper portion thereof. The opening 5 extends along the length direction B of the elastic element 4.

Referring particularly to FIG. 3, the elastic element 4 has a U-shaped cross section. Upper sections of the side walls 7 each form a curved section 8 at two distal ends thereof. The curved section 8 extends outwardly and upwardly to form a grip for gripping the positive lead and/or negative lead 2 of the cells 20 firmly and improving the resilience of the elastic element 4.

In the illustrated embodiment, the elastic element 4 is made from a copper alloy having desirable resilience and electrical conductivity. However, in accordance with one alternative embodiment of the present invention, the elastic elements 4 can also be made from other materials known to one ordinary skill in the art.

The battery case 1 can be divided into a number of chambers via a number of separating boards (not shown) in a similar manner to that been disclosed in Chinese patent application No. CN 200620001192.9, and the cells 20 are positioned in the corresponding chambers, respectively.

The multiple-cell battery of the present invention further includes a lower cover 16 securely coupled to a lower section of the battery case 1 and an upper cover 9 coupled to an upper section of the battery case 1. The upper cover 9 defines a number of through holes 10 corresponding to the elastic elements 4, from which the positive leads and/or negative leads 2 extending out of the battery case 1. The upper cover 9 is fixed to the battery case 1 via a number of screws (not shown).

In the illustrated embodiment of the present invention, the battery case 1 is made from aluminum material having desirable heat dissipating property, to dissipate the heat generated during the work of the cells 20 effectively. However, the configuration and shape of the battery case 1 can also be designed according to different requirements of the battery.

In assembly of the cells 20, the separating boards made from aluminum are coated with bonding material, for instance glue. Meanwhile, the surface of each cell 20 is also coated with glue. The separating board and the cell 20 bonded together are disposed in the battery house 1, with the separating boards being correspondingly positioned in a number of slots (not shown) defined in the side wall of the battery case 1, respectively In assembly of the elastic element 4, the upper cover 9 is removed. The elastic elements 4 are correspondingly inserted between every two adjacent positive leads and/or negative leads 2, with the planar bottom sections 6 thereof positioned on corresponding stepped surfaces 3 of the positive leads and/or negative leads 2. The contacting portions 12 of the elastic elements 4 resiliently and firmly resist the two sidewalls of the cells 20. The upper cover 9 is then secured to the battery case 1.

It should be understood that although the present invention are described with reference to multi-cell lithium-ion battery, the concept of the present invention still can be used in other multi-cell batteries.

While the present invention has been illustrated by the above description of the preferred embodiment thereof, while the preferred embodiment has been described in considerable detail, it is not intended to restrict or in any way limit the scope of the appended claims to such details. Additional advantages and modifications within the spirit and scope of the present invention will readily appear to those skilled in the art. Therefore, the present invention is not limited to the specific details and the illustrative examples shown and described.

What is claimed is:

1. A multiple-cell battery, comprising:
a battery case;
a plurality of cells suitably housed in the battery case, each of the cells having a positive lead and a negative lead; and
a plurality of electrically conductive elastic elements correspondingly situated between every two adjacent positive leads and/or negative leads, the elastic element each being formed with at least two contacting portions resiliently abutting against the two adjacent positive and/or negative leads, respectively, so as to connect the cells in series and/or in parallel;
wherein each elastic element further includes a planar bottom section connected between the contacting portions and two curved sections extending outwardly and upwardly from two distal ends of the contacting portions, such that the elastic element has a substantially U-shaped cross section formed of the planar bottom section, the contacting portions, and the curved sections; and
wherein the two curved sections grip the two adjacent positive and/or negative leads such that the elastic elements are retained between the two adjacent positive and/or negative leads.

2. The multiple-cell battery of claim 1, wherein each positive lead and/or negative lead is correspondingly provided with a stepped surface for supporting the planar bottom section of the elastic element.

3. The multiple-cell battery of claim 1, wherein the elastic element is made from copper alloy.

4. The multiple-cell battery of claim 1, wherein each elastic element defines an opening at an upper portion thereof and the opening extends along a length direction of the elastic element.

5. The multiple-cell battery of claim 1, wherein the battery case comprises an upper cover, the upper cover defines a plurality of through holes corresponding to the elastic elements.

6. A method for assembling a multi-cell battery, comprising the steps of:
providing a battery case;
securely positioning a plurality of cells in the battery case, each of the cells comprising a positive lead and a negative lead;
correspondingly disposing a plurality of electrically conductive elastic elements between every two adjacent positive leads and/or negative leads;

wherein each elastic element includes at least two contacting portions resiliently abutting against the two adjacent positive leads and/or negative leads, respectively, a planar bottom section connected between the contacting portions, and two curved sections extending outwardly and upwardly from two distal ends of the contacting portions, such that the elastic element has a substantially U-shaped cross section formed of the planar bottom section, the contacting portions, and the curved sections; and wherein the two curved sections grip the two adjacent positive and/or negative leads such that the elastic elements are retained between the two adjacent positive and/or negative leads.

7. The method for assembling the multi-cell battery of claim 6, wherein each positive lead and/or negative lead is formed with a corresponding stepped surface adapted for supporting the planar bottom section of the elastic element.

8. The method for assembling the multi-cell battery of claim 6, wherein the elastic element is made from a copper alloy.

9. The method for assembling the multi-cell battery of claim 6, wherein each elastic element defines an opening at an upper portion thereof and the opening extends along a length direction of the elastic element.

* * * * *